United States Patent [19]

Mélan et al.

[11] Patent Number: 4,708,562

[45] Date of Patent: Nov. 24, 1987

[54] APPARATUS FOR LINING THE INNER WALL OF A VESSEL WITH BRICKS

[75] Inventors: Corneille Mélan, Eberhardt; Jean Liesch, Esch-sur-Alzette, both of Luxembourg

[73] Assignees: Paul Wurth S.A.; Arbed S.A., both of Luxembourg

[21] Appl. No.: 915,635

[22] Filed: Oct. 6, 1986

[30] Foreign Application Priority Data

Oct. 10, 1985 [LU] Luxembourg .......................... 86114

[51] Int. Cl.[4] ........................ B65G 59/02; E04G 21/22

[52] U.S. Cl. ........................................ 414/10; 52/747; 266/281; 414/120

[58] Field of Search ................. 414/10, 117, 120, 121; 52/747, 749; 266/281

[56] References Cited

U.S. PATENT DOCUMENTS

| | | | |
|---|---|---|---|
| Re. 28,305 | 1/1975 | Williamson et al. ............ | 52/747 X |
| 3,955,685 | 5/1976 | Smith .................................. | 414/10 |

FOREIGN PATENT DOCUMENTS

| | | | |
|---|---|---|---|
| 58251 | 8/1982 | European Pat. Off. .............. | 414/10 |
| 1154131 | 9/1963 | Fed. Rep. of Germany ...... | 266/281 |
| 3344261 | 8/1984 | Fed. Rep. of Germany . | |
| 3413806 | 1/1985 | Fed. Rep. of Germany . | |
| 2070868 | 9/1971 | France . | |
| 54-33463 | 3/1979 | Japan .................................. | 414/120 |

*Primary Examiner*—Leslie J. Paperner

*Attorney, Agent, or Firm*—Fishman & Dionne

[57] ABSTRACT

An automated apparatus for lining the inner wall of a vessel with bricks is presented. This apparatus comprises an operating station which has at least two levels for storing pallets (having bricks thereon) above one another. An automatic device consisting of at least one automatic depalletizing mechanism for transferring the bricks from each of the superimposed pallets onto at least one standby track is provided along with at least one robot equipped with a gripping device for picking up bricks located on the stand-by tracks and for depositing the bricks at the intended location. In accordance with a preferred embodiment of the present invention, the operating station has two automatic depalletizing mechanisms associated respectively with each of the two superimposed pallets.

18 Claims, 5 Drawing Figures

APPARATUS FOR LINING THE INNER WALL OF A VESSEL WITH BRICKS

BACKGROUND OF THE INVENTION

This invention relates to an apparatus for lining the inner wall of a vessel with bricks. More particularly, this invention relates to a brick laying apparatus comprising an operating station capable of being lowered or raised inside a vessel; the operating station being provided with (1) means for intermediate storage of at least two brick pallets; (2) automatic means for handling the bricks, and (3) means for raising or lowering the pallets towards the operating station. The present invention, although not being limited thereto in its utility, is particularly well suited as an apparatus for laying a refractory lining on the inner wall of a metallurgical converter or similar vessel.

Various apparatus of the type hereinabove described (see, for example, LU-A-62236) have already been proposed for carrying out a job which, until recently, has usually been automatically carried out manually under extremely arduous conditions. Unfortunately, not all of the problems associated with automatic brick laying have been solved, so that, up to now, it has still not been possible to benefit systematically from the complete automation of the brick-lining operation; and the automatic apparatus intended for this purpose have remained at the project or test stage.

There are several reasons why automatic brick lining apparatus have not been perfected. First, the shutdown time of a converter (i.e., bricks) for the purpose of replacing its refractory covering is limited by interdependence on other metallurigical operations. Also, the complexity of the automatic movements to be carried out (by an automated brick laying apparatus) makes it difficult to achieve the necessary bricklaying rate required to adhere to this limited time schedule.

In this regard, it will be appreciated that the bricks have a frustoconical shape, so that they can form circular layers in accordance with the cross-section of the converter. Now, not only is every converter of a different size, but also, the diameter of each converter varies according to its height (because converters usually have a substantially oval vertical cross-section). Since it is not possible or feasible to make bricks to measure, two or more particular types of bricks of differing conicity are produced, and by carefully alternating the choice of these types, the desired curvatures corresponding to a particular converter are finally obtained.

Consequently, during the bricklining operation, at least one pallet of each type must be available on the platform of the operating station. Therefore, if a robot is used for the automatic laying of the bricks, this robot must be designed so that its arm can move automatically between the location where the bricks are to be laid and each of the two pallets, depending on the type of brick required. Although such a robot is technically possible, its production nevertheless presents new problems. First of all, the space required for storing two pallets and the sweeping range necessary for the movement of the robot increase the dimensions of the operating station, so that such automatic apparatus can only be used for converters exceeding a certain size. Furthermore, the amount of movement which the robot has to sweep over covers a large portion of the surface of the operating station and is a danger for the operator standing on the platform of this larger station. In addition, the rapid rotation of the long arms of the robot generates substantial forces of acceleration and deceleration, and these forces have to be absorbed by the walls of the converter via suitable supporting devices.

SUMMARY OF THE INVENTION

The above-described and other problems and deficiencies of the prior art are overcome or alleviated by the automated apparatus for lining the inner wall of a vessel with bricks of the present invention. In accordance with the present invention, an operating station is provided which has at least two levels for storing pallets (having bricks thereon) above one another. Automatic means consisting of at least one automatic depalletizing mechanism for transferring the bricks from each of the superimposed pallets onto at least one standby track is provided along with at least one robot equipped with a gripping device for picking up bricks located on the stand-by tracks and for depositing them at the intended location.

In accordance with a preferred embodiment of the present invention, the operating station has two automatic depalletizing mechanisms associated respectively with each of the two superimposed pallets.

The apparatus of the present invention consequently has two essential and complementary features, in particular the superimposition of the pallets; and the separation of the depalletizing function and the function of delivering the bricks to the proper location.

The superimposition of the pallets reduces the horizontal bulk of the operating station and makes it possible to use the same operating station for repairing converters of smaller size (as well as large size). Moreover, the separation of the depalletizing and brick laying functions makes it possible to reduce the amount of sweep of the robot thereby contributing to a decrease in the horizontal bulk, lessening the dangers for the personnel standing on the platform of the operating station, and reducing the forces to be absorbed.

The separation of the depalletizing and brick laying functions also makes it possible to carry out the operations more quickly, because these operations take place in parallel, and consequently offers the possibility of repairing the refractory covering within the limited time required. Furthermore, since the amount of movement of the robot becomes less as a result of the separation of the functions, this robot can be made much smaller and much lighter.

In a preferred embodiment of the present invention, the operating station has a bracket with three levels. The lower level consists of a platform on which at least one first pallet-holding carriage is located. The intermediate level supports at least one second pallet-holding carriage and a first automatic mechanism for depalletizing the pallet of the first carriage. Finally, the upper level supports a second automatic mechanism for depalletizing the pallet of the second carriage and the robot. This preferred design of the operating station provides a very compact structure with the most effective possible grouping of the various functions and movements and with minimum risks to the monitoring and control personnel.

The upper level of the bracket can also have a winch, on which is suspended (by means of a cable) a fork or any other device suitable for raising and lowering the pallets through an orifice in the platform. Instead of being mounted in the operating station, the pallets can also be lowered through an orifice in the upper level of the bracket by means of a cable and a winch. The operating stations itself can be suspended on cables or can be carried by telescopic masts. The pallet-holding carriages are preferably equipped with rollers moving on rails and can be shifted horizontally between a position located in the path of the fork and a depalletizing position.

In addition, the bracket possesses two superimposed gutters for receiving the depalletized bricks, these gutters being mounted respectively on the platform and at the intermediate level and forming the stand-by tracks. These gutters (which can be telescopic) extend parallel to the shifting direction of the pallet-holding carriages.

The robot is mounted on a beam which can be shifted horizontally in the longitudinal direction of the gutters, while the latter are provided with means of advancing the bricks. The movable supporting beam for the robot can be carried by the super structure of the operating station or by the platform. The brick-gripping device of the robot consists of tongs or a suction cup.

The above-described and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several Figures.

DESCRIPTION OF THE PREFERRED EMBODIMENT

Figure 1:
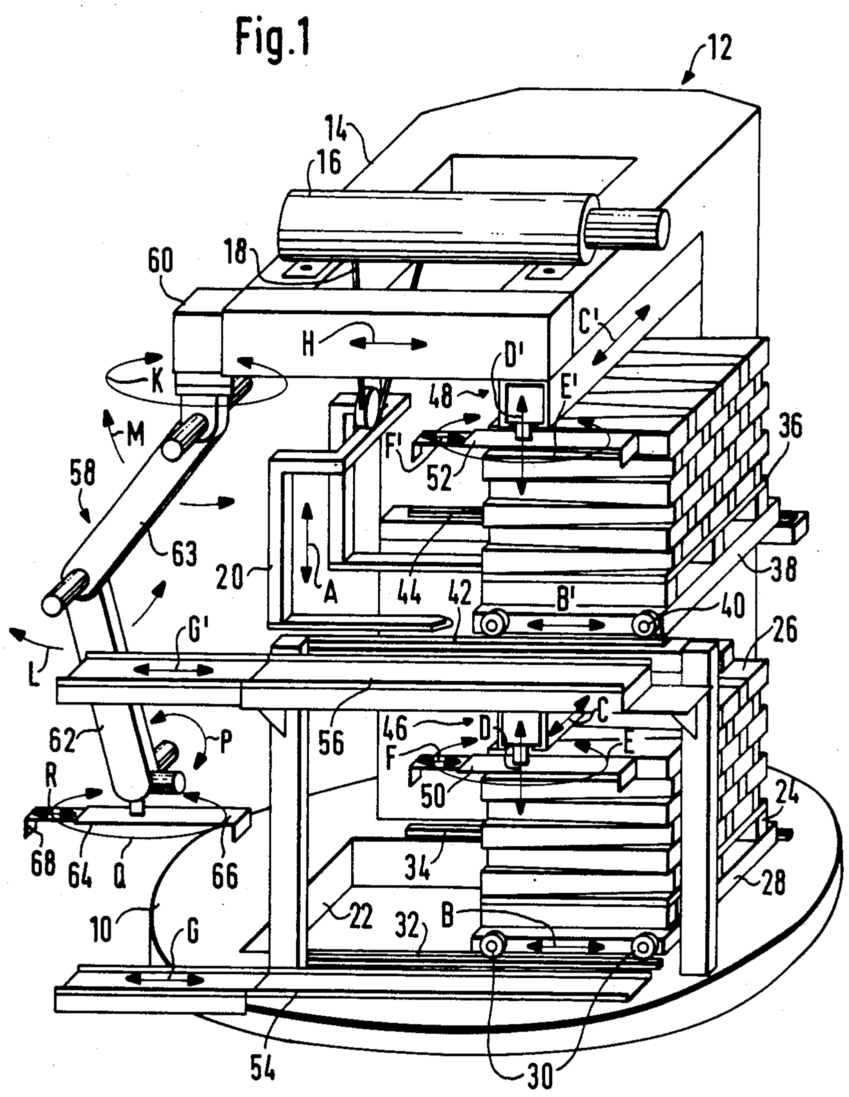
FIG. 1 is a perspective view of an operating station in accordance with the present invention.

The operating station illustrated in FIG. 1 has a circular platform 10, on which a bracket 12, is erected. Platform 10 can possess means (not shown) of wedging and stabilizing the operating station inside a converter.

The upper level of bracket 12 is formed by a frame 14 parallel to platform 10 and supporting a winch 16. Winch 16 provides vertical movement to a fork 20 (symbolized by the arrow A), by means of a cable 18 via an orifice 22 provided for this purpose in platform 10. Fork 20 raises pallets loaded with bricks, and lowers empty pallets (and, if appropriate, broken bricks).

Located on platform 10 is a first pallet 24 of bricks 26 which, because of their frustoconical shape, are stacked alternately in one direction and the other on the pallet. Pallet 24 is placed on a pallet-holding carriage 28 which is equipped with rollers 30 moving on a pair of rails 32, 34. Carriage 28 can be shifted manually or automatically by suitable known means (not shown) in the direction of the arrow B between the depalletizing position shown in the Figure and a loading or unloading position above orifice 22.

A second pallet 36 is shown in a depalletizing position above the first pallet 24. This pallet is likewise carried by a carriage 38 moving in the direction of arrow B′ on a pair of rails 42, 44, by means of rollers 40.

An automatic depalletizing mechanism 46, 48 is arranged above each of pallets 24, 36 respectively. Each of these automatic mechanisms 46, 48 is equipped with tongs 50, 52 respectively for grasping and freeing the bricks. These automatic mechanisms, the details of which will also be explained with reference to the following Figures, each have up to four (4) degrees of freedom symbolized by the arrows C, D, E, F and C′, D′, E′, and F′, respectively.

As a result of these degrees of freedom, the two automatic mechanism 46, 48 are capable of transferring bricks 26 from each of pallets 24, 36, into a lower gutter 54 for the lower automatic mechanism 46 and into a gutter 56 for the upper automatic mechanism 48. The two gutters 54, 56, which extend parallel to the shifting direction of carriages 28, 38, can be telescopic, as indicated by the arrows G, G′, and possess means known per se, such as conveyor belts, runners, alternating movement systems, etc, for advancing the bricks deposited by the automatic depalletizing mechanisms.

The depalletized bricks, standing-by in gutters 54, 56, are grasped by a robot 58 and automatically laid. Robot 58 is suspended from the upper level of bracket 12 on a beam 60 which can be shifted horizontally in the direction of the arrow H telescopically or by other known means. The suspension of robot 58 on beam 60 has one degree of freedom indicated by the arrow K, allowing the robot to rotate about a vertical axis. This robot 58 comprises essentially a pair of arms 62, 63 connected by means of a joint of horizontal axis (arrow L) and suspended by means of another joint with a horizontal pivot exit (arrow M).

A system 64 for gripping the bricks is mounted on the free end of lower arm 62 by means of a double joint with horizontal pivot axes symbolized by the arrow P and with vertical pivot axes symbolized by the arrow Q.

In the embodiment illustrated in FIG. 1, gripping device 64 consists of tongs comprising a fixed jaw 66 and a jaw 68 movable in the direction of the arrow R.

Figure 2:
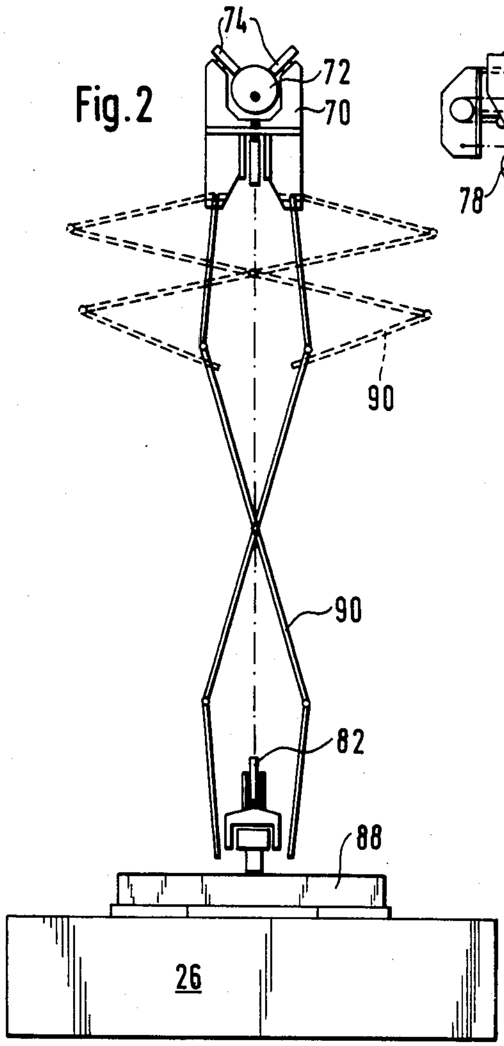
FIG. 2 is a front elevation view of a first embodiment of an automatic brick depalletizing mechanism.
Figure 3:
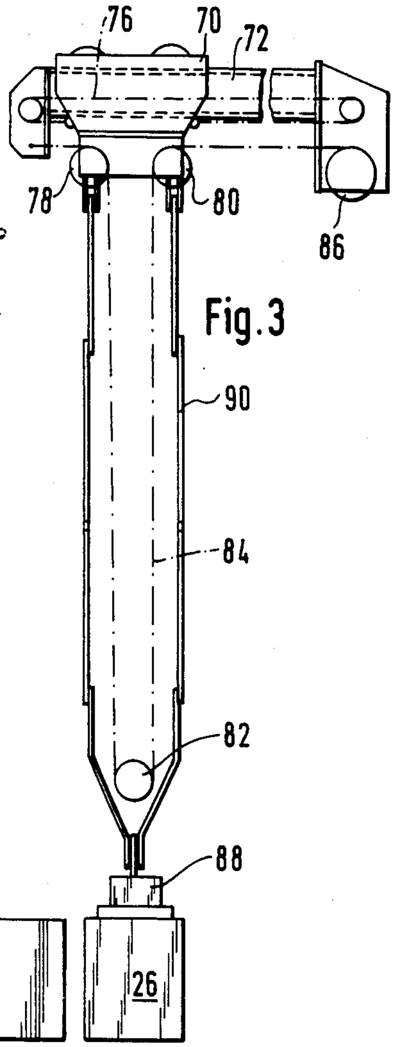
FIG. 3 is a side elevation view of the depalletizing mechanism of FIG. 2.

Gripping device 64 can also consist of suction cups (see 82 in FIGS. 2 and 3). Suction cups have the advantage of greater simplicity. On the other hand, the advantage of tongs is that they can grasp two superimposed bricks at the same time and thus virtually double the brick laying rate.

All the degrees of freedom and movements represented by the various arrows in FIG. 1 are effected automatically under the action of captors and programmes, so that the operator's job is essentially restricted to a monitoring function, such as, for example, the detection of broken bricks.

In addition to the degrees of freedom mentioned above, it will be appreciated that the bracket as a whole can rotate about its vertical axis under the action of rotating means (not shown), in order to move the robot successively opposite all the points on the periphery of the vessel.

FIGS. 2 and 3 show a front view and a side view respectively of a first depalletizing system. These Figures show a hoist 70 suspended from a beam 72 forming part of bracket 12. This suspension is produced by means of rollers 74, for example as shown in FIG. 3, so that hoist 70 can be shifted along beam 72 according to the arrow "C" or "C′" in FIG. 1 (for example by means of an endless chain 76 actuated by known means (not shown)).

A pulley block is provided consisting of two fixed pulleys 78, 80 and a loose idling pulley 82. A supporting cable 84 is wound around the pulley block and ensures the degree of freedom represented by the arrows "D" or "D'" in FIG. 1. The winding of cable 84 onto a winch 86 raises pulley 82, while unwinding cable 84 makes it possible to lower the latter in a controlled manner. Pulley 82 carries a system for gripping bricks 26, which is a suction cup 88 in the example shown in FIGS. 3 and 4.

It will be appreciated that a suction cup makes the degree of freedom represented by "F" or "F'" in FIG. 1 superfluous. For the degree of freedom in "E" or "E'", there is, between pulley 82 and suction cup 88, a rotary joint which has a vertical pivot axis and which can be actuated, for example, by means of a small electric motor. To prevent bricks 26 from oscillating during the horizontal shift of hoist 70 along beam 72, suction cup 88 is connected to hoist 70 by means of a type of collapsible pantograph 90, the retracted and extended positions of which are represented in FIG. 2 respectively by broken lines and unbroken lines. It will be understood that a depalletizing system of the type shown in FIGS. 2 and 3 is located above each of pallets 24 and 36.

Figure 4:
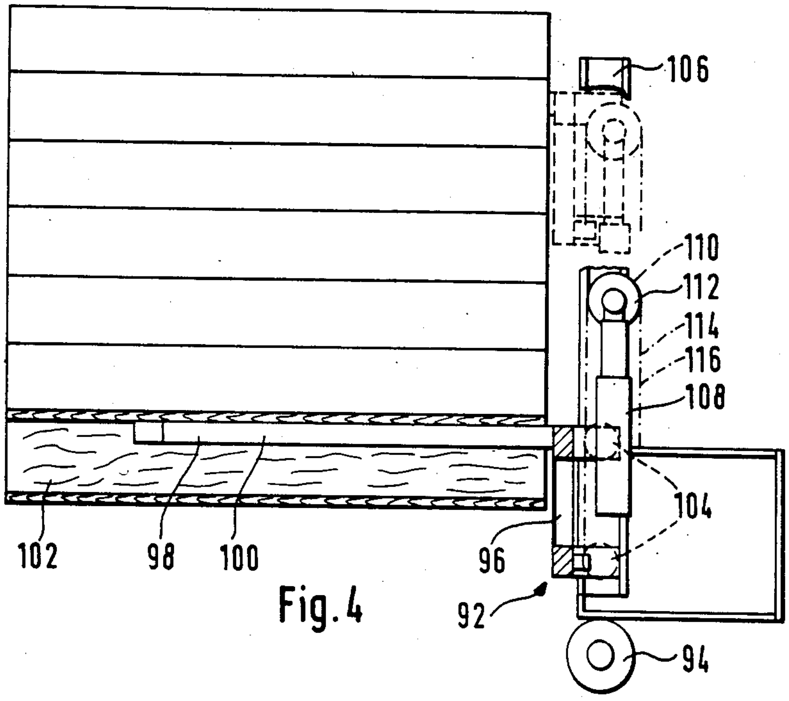
FIG. 4 is a side elevation view of another depalletizing mechanism of the present invention.
Figure 5:
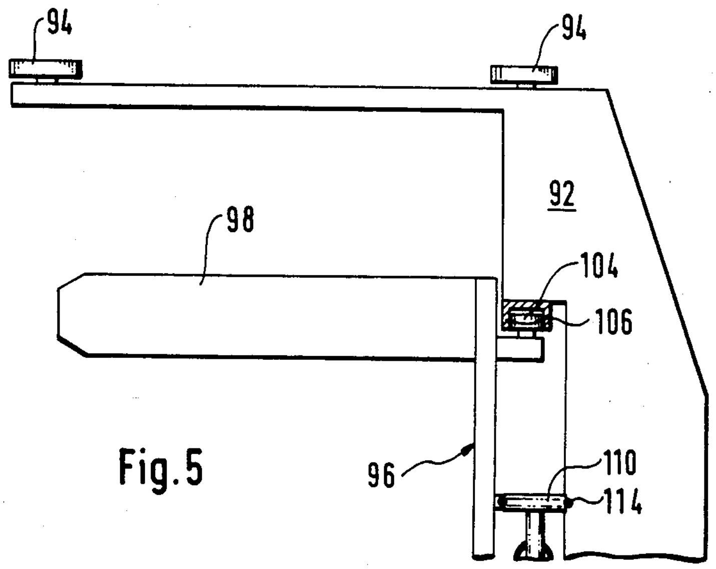
FIG. 5 is an expanded view of the depalletizing mechanism of FIG. 4.

FIGS. 4 and 5 illustrate another depalletizing system. In the FIGS. 4 and 5 depalletizing system, the degree of freedom "D38 or "D'" is replaced by a mounting system for pallets 24 and 36. The automatic mechanisms per se can be designed as shown at 46 and 48 in FIG. 1, the degree of freedom in "C" and "C'" being assured, for example, by means of a telescopic beam actuated by a jack or a rail/roller system similar to that of FIGS. 2 and 3.

To raise the pallets, each of the carriages 28 and 38 is converted into a fork-lift carriage of the type shown at 92 in FIGS. 4 and 5. Carriage 92 similarly moves on rails 32, 34 or 42, 44 of FIG. 1 by means of rollers 94. Carriage 92 has a fork 96 with two arms 98, 100 for carrying a pallet 102. Fork 96 can slide vertically by means of rollers 104 moving in vertical side rails 106 of carriage 92.

Pallet 102 can be raised and lowered under the action of a jack 108 mounted vertically on carriage 92 in the mid-plane of arms 98, 100 of lifting fork 96. Arranged on the end of the rod of jack 108 are one or preferably two pulleys 110 and 112, around which are guided two supporting cables 114, 116 fastened respectively to carriage 92 on the one hand and to lifting fork 96 on the other hand. Fork 96 and pallet 102 are raised as a result of the extension of jack 108, for example from the position represented by unbroken lines in FIG. 4 towards the position represented by the broken lines. The advantage of the cable or cables is that the vertical travel of fork 96 is double that of the rod of jack 108.

Whatever the design of the automatic depalletizing mechanism, it is possible to provide either tongs, as in the embodiment of FIG. 1 or that of FIGS. 4 and 5, or a suction cup, as shown at 88 in FIGS. 2 and 3.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for lining the inner wall of a vessel with bricks comprising:
operating station means capable of being lowered or raised inside the vessel and including;
means for the intermediate storage of at least two brick pallets;
automatic means for handling the bricks; and
means for raising or lowering the pallets towards the operating station;
wherein said operating station further includes;
at least two levels for superimposing said pallets above one another; and
said automatic brick handling means comprising;
at least one automatic depalletizing means for transferring the bricks from each of the superimposed pallets onto at least one stand-by track; and
at least one robot equipped with gripping means for picking up the bricks located on the stand-by track and for depositing the bricks at an intended location.

2. Apparatus according to claim 1 wherein:
said operating station means has at least two automatic depalletizing means associated respectively with each of said two superimposed pallets.

3. Apparatus according to claim 1 wherein said operating station means includes:
bracket means with three levels, said lower level including a platform having at least one first pallet-holding carriage located thereon, said intermediate level supporting at least one second pallet-holding carriage and a first automatic means for depalletizing the pallet of said first carriage, and said upper level having a second automatic means for depalletizing the pallet of said second carriage, and including said robot thereon.

4. Apparatus according to claim 2 wherein said operating station means includes:
bracket means with three levels, said lower level including a platform having at least one first pallet-holding carriage located thereon, said intermediate level supporting at least one second pallet-holding carriage and a first automatic means for depalletizing the pallet of said first carriage, and said upper level having a second automatic means for depalletizing the pallet of said second carriage, and including said robot thereon.

5. Apparatus according to claim 3 wherein:
said upper level of said bracket means also supports a winch and wherein a fork is suspended by means of a cable from said winch for raising and lowering the pallets through an orifice in said platform.

6. Apparatus according to claim 4 wherein:
said upper level of said bracket means also supports a winch and wherein a fork is suspended by means of a cable from said winch for raising and lowering the pallets through an orifice in said platform.

7. Apparatus according to claim 3 wherein:
said pallet supporting carriages are equipped with rollers moving on two pairs of rails and which can be shifted horizontally between a position located in the path of said fork and a depalletizing position.

8. Apparatus according to claim 5 wherein:
said pallet supporting carriages are equipped with rollers moving on two pairs of rails and which can be shifted horizontally between a position located in the path of said fork and a depalletizing position.

9. Apparatus according to claim 3 wherein:
said bracket means includes two superimposed gutters for receiving the depalletized bricks, said gutters being mounted respectively on said platform and at said intermediate level and forming the stand-by tracks.

10. Apparatus according to claim 9 wherein: said gutters are telescopic and extend parallel to the shifting direction of said pallet-holding carriages.

11. Apparatus according to claim 3 wherein: said robot is mounted on a beam which can be shifted horizontally in the longitudinal direction of said gutters.

12. Apparatus according to claim 9 wherein: said gutters are equipped with means for advancing the bricks.

13. Apparatus according to claim 11 wherein: said gutters are equipped with means for advancing the bricks.

14. Apparatus according to claim 1 wherein each of said automatic depalletizing means comprises:

gripping means attached to vertically moving pulley means; and a hoist which is mounted on said bracket and which can be shifted horizontally above each of said pallets.

15. Apparatus according to claim 14 including: a collapsible linkage defining a pantograph, mounted between said hoist and said gripping means.

16. Apparatus according to claim 3 wherein each automatic depalletizing means comprises:

gripping means which is carried by said bracket means and which can be shifted horizontally above each of said pallets; and wherein each carriage defines a lifting carriage with a fork.

17. Apparatus according to claim 1 wherein: said gripping means of said robot and said automatic depalletizing means comprise tongs.

18. Apparatus according to claim 1 wherein: said gripping means of said robot and of said automatic depalletizing means comprise suction cups.

* * * * *